US00RE49266E

(19) United States
(12) Reissued Patent
MacKinnon

(10) Patent Number: US RE49,266 E
(45) Date of Reissued Patent: Nov. 1, 2022

(54) ENGINEERED PUSH UP INSERT

(71) Applicant: Signature Napkins Inc., Spring Lake, NJ (US)

(72) Inventor: Debra MacKinnon, Spring Lake, NJ (US)

(73) Assignee: Signature Napkins Inc., Spring Lake, NJ (US)

(21) Appl. No.: 16/661,764

(22) Filed: Oct. 23, 2019

Related U.S. Patent Documents

Reissue of:
(64) Patent No.: 8,216,021
Issued: Jul. 10, 2012
Appl. No.: 12/461,116
Filed: Jul. 31, 2009

U.S. Applications:
(63) Continuation of application No. 15/594,295, filed on May 12, 2017, now Pat. No. Re. 47,668, which is a continuation of application No. 14/851,822, filed on Sep. 11, 2015, now Pat. No. Re. 46,407, which is a continuation of application No. 14/327,362, filed on Jul. 9, 2014, now Pat. No. Re. 45,838, which is an application for the reissue of Pat. No. 8,216,021.
(Continued)

(51) Int. Cl.
*A41C 3/00* (2006.01)
*A41C 3/10* (2006.01)
*A41C 3/14* (2006.01)

(52) U.S. Cl.
CPC ..... *A41C 3/144* (2013.01); *A41C 3/10* (2013.01)

(58) Field of Classification Search
CPC .... A41C 3/10; A41C 3/12; A41C 3/14; A41C 3/144; A41C 3/146
See application file for complete search history.

(56) References Cited

U.S. PATENT DOCUMENTS 2,664,571 A 1/1954 Kempel
2,679,646 A 6/1954 Cousins
(Continued)

FOREIGN PATENT DOCUMENTS

JP 2005-783091 11/2005
JP 2005320666 A * 11/2005 ..... A41C 3/144

OTHER PUBLICATIONS

Definition of silicone, www.dictionary.com, May 2015.

*Primary Examiner* — Patricia L Engle
(74) *Attorney, Agent, or Firm* — Oblon, McClelland, Maier & Neustadt, L.L.P.

(57) ABSTRACT

Kidney-shaped push up insert including first lobe and second lobe is provided. Notch is formed in top side between first lobe and second lobe. Insert has depression formed adjacent top side extending towards notch. Second main surface opposes first main surface. Second main surface is substantially smooth arcuate-shaped surface. First lobe has narrower width between top side and bottom side than second lobe, and second lobe is thicker between first main surface and second main surface than first lobe. Ratio of maximum thickness between first main surface and second main surface to maximum length between opposing ends of first lobe and second lobe is less than about 9 and/or ratio of depth of notch from a straight line connecting first lobe and second lobe along top side of insert to width of insert from top side to bottom side at depth of notch is less than about 4.

8 Claims, 21 Drawing Sheets

Related U.S. Application Data

(60) Provisional application No. 61/085,335, filed on Jul. 31, 2008.

(56) References Cited

U.S. PATENT DOCUMENTS

| | | | | | |
|---|---|---|---|---|---|
| 2,697,228 | A * | 12/1954 | Orr | 450/57 | |
| 2,817,842 | A | 12/1957 | Block et al. | | |
| 2,834,352 | A * | 5/1958 | Ullian | 450/57 | |
| 3,257,951 | A * | 6/1966 | Espenschied et al. | 92/140 | |
| 3,384,091 | A * | 5/1968 | Block | 450/54 | |
| 3,814,107 | A * | 6/1974 | Greenblatt et al. | 450/56 | |
| 4,992,074 | A * | 2/1991 | Diaz | 450/81 | |
| 6,042,608 | A * | 3/2000 | Ishikawa et al. | 623/7 | |
| 6,101,630 | A | 8/2000 | Lee | | |
| 6,231,423 | B1 | 5/2001 | Deal et al. | | |
| 6,296,545 | B1 | 10/2001 | Chen | | |
| 6,299,505 | B1 * | 10/2001 | Huang | A41C 3/144 | 450/57 |
| 6,443,806 | B1 * | 9/2002 | Fang | 450/57 | |
| 6,544,100 | B1 | 4/2003 | Nadsady | | |
| 7,163,433 | B2 * | 1/2007 | Chou | 450/81 | |
| 7,628,811 | B1 | 12/2009 | Gaskill | | |
| D655,476 | S | 3/2012 | Naughton et al. | | |
| 2020/0170311 | A1 * | 6/2020 | Hirakubo | A41C 3/144 | |

* cited by examiner

ENGINEERED PUSH UP INSERT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

*Notice: More than one reissue application has been filed for the reissue of U.S. Pat. No. 8,216,021. The additional reissue applications are: application Ser. No. 14/327,362 (RE45,838) filed Jul. 9, 2014, is a reissue of U.S. Pat. No. 8,216,021; application Ser. No. 14/851,822 (RE46,407) filed Sep. 11, 2015, is a continuation reissue application of application Ser. No. 14/327,362; application Ser. No. 15/594,295 (RE47,668) filed on May 12, 2017 is a continuation reissue application of application Ser. No. 14/851,822; and the present application is a continuation reissue application of application Ser. No. 15/594,295.* This application claims the benefit of priority of U.S. Provisional Application Ser. No. 61/085,335 filed Jul. 31, 2008.

FIELD OF THE INVENTION

The present disclosure is directed to push up inserts for enhancing cleavage and adding volume, thus, improving appearance and the fit of clothing.

BACKGROUND

Pads are typically inserted into the cups of a bra to fill out the bra. An example of a plastic pad is shown in FIG. 1, illustrating an approximately semi-circular-shaped pad 10. FIG. 2 illustrates another example of a pad 20 having cloth exterior encasing a foam pad. The cloth/foam pad is thin, about ½ inch thick at its maximum thickness. The outer cloth exterior of the foam pad 20 is secured by stitching 22 around the periphery 24 of the pad 20.

The prior art foam pads do not push up breasts and do not create cleavage and volume. The prior art plastic and foam pads do not wrap around breasts and are not contoured to the breast to create a natural shape. The prior art pads do not anatomically fit the breasts to provide natural-looking, enhanced cleavage. Thus, it would be desirable to provide a soft insert that is anatomically designed to conform to the breasts to provide a better fit, more lift, greater cleavage, and increased volume.

SUMMARY OF THE DISCLOSURE

There exists a need for a soft shaping insert that is anatomically designed to conform to and push up the breasts, thereby increasing volume and cleavage, while providing a natural shape.

These and other needs are met by embodiments of the present disclosure, which provide a kidney-shaped push up insert comprising a first lobe, and a second lobe on an opposing side of the insert from the first lobe. The insert has a top side and a bottom side on an opposing side of the insert from the top side. A notch is formed in the top side, between the first lobe and second lobe. The insert has a first main surface having a depression formed adjacent the top side and the depression extends towards the notch. A second main surface opposes the first main surface. The second main surface is a substantially smooth arcuate-shaped surface. [The first lobe is narrower in width between the top side and the bottom side than the second lobe, and the second lobe is thicker between the first main surface and the second main surface than the first lobe.] A ratio of a maximum thickness between the first main surface and the second main surface to a maximum length between opposing ends of the first lobe and second lobe is less than about 9.

According to another embodiment of the present disclosure, a kidney-shaped push up insert is provided comprising a first lobe, and a second lobe on an opposing side of the insert from the first lobe. The insert has a top side, and a bottom side on an opposing side of the insert from the top side. A notch is formed in the top side between the first lobe and second lobe. The insert has a first main surface having a depression formed adjacent the top side and the depression extends towards the notch. A second main surface opposes the first main surface. The second main surface is a substantially smooth arcuate-shaped surface. [The first lobe is narrower in width between the top side and the bottom side than the second lobe, and the second lobe is thicker between the first main surface and the second main surface than the first lobe.] A ratio of a depth of the notch from a straight line connecting the first lobe and second lobe along the top side of the insert to a width of the insert from the top side to the bottom side at the notch is less than about 4.

DETAILED DISCLOSURE

Figure 1:
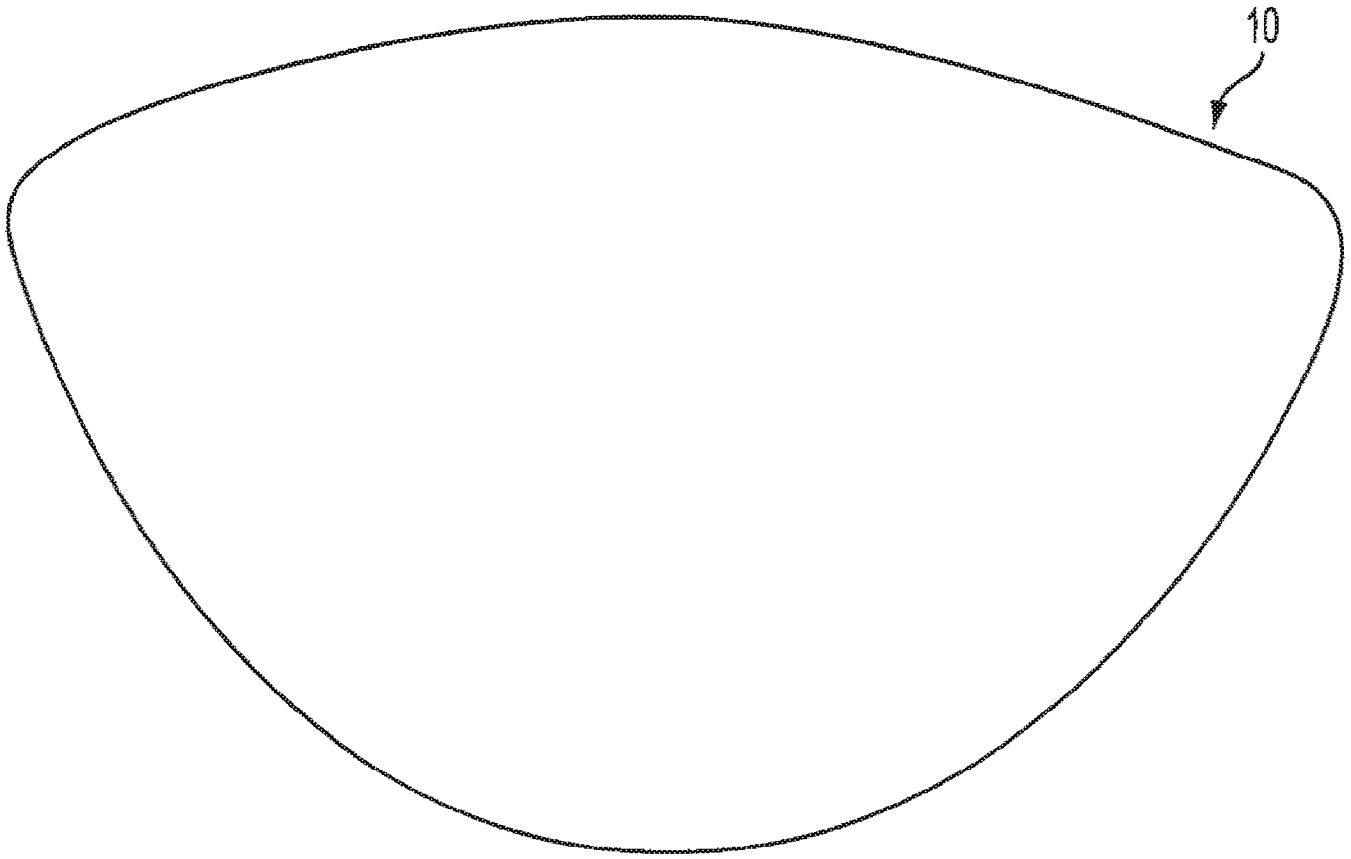
FIG. 1 PRIOR ART
FIG. 1 is an illustration of a main surface of a prior art plastic pad.
Figure 2:
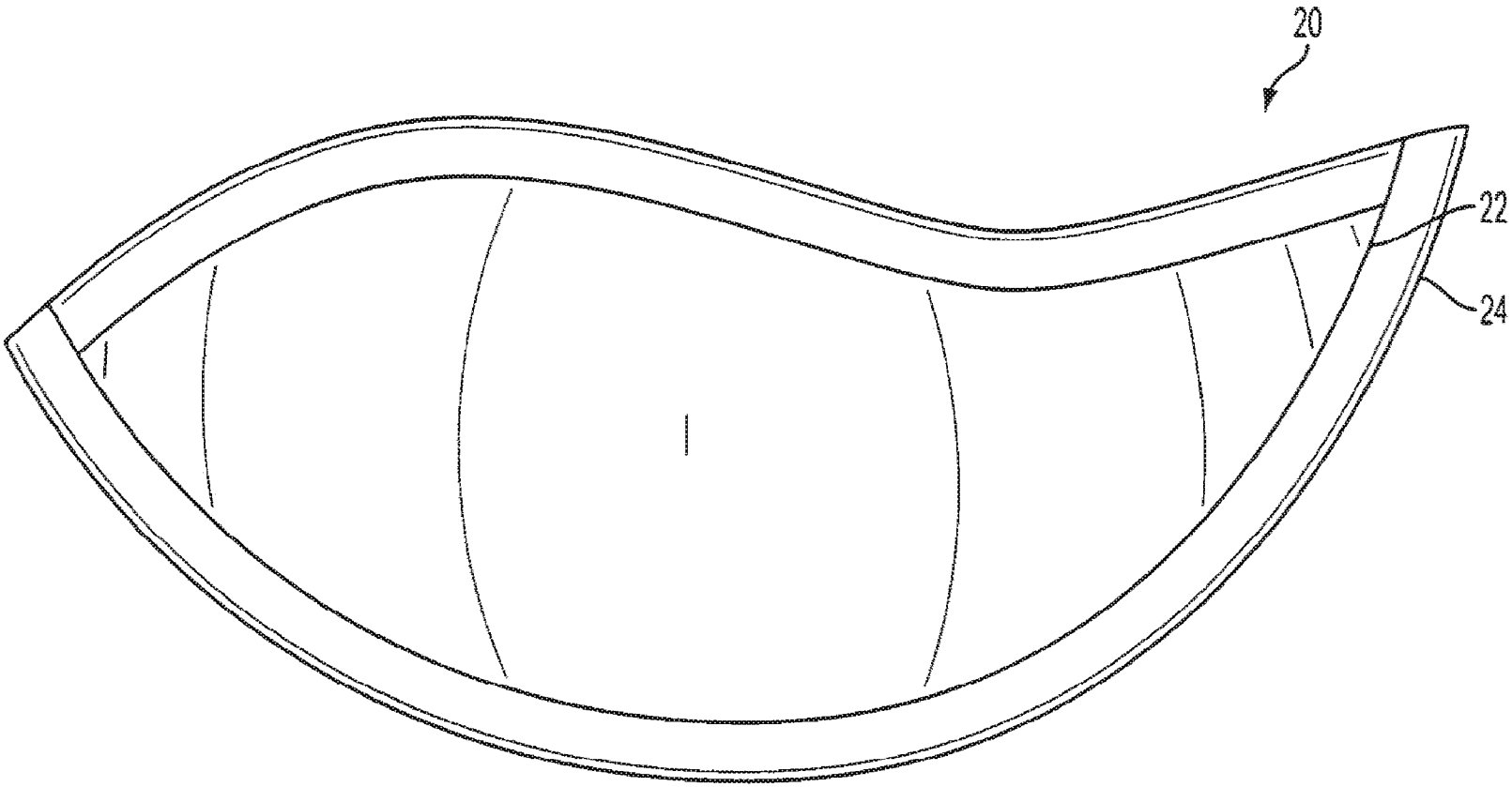
FIG. 2 PRIOR ART
FIG. 2. is an illustration of a main surface of a prior art cloth over foam pad.
Figure 3:
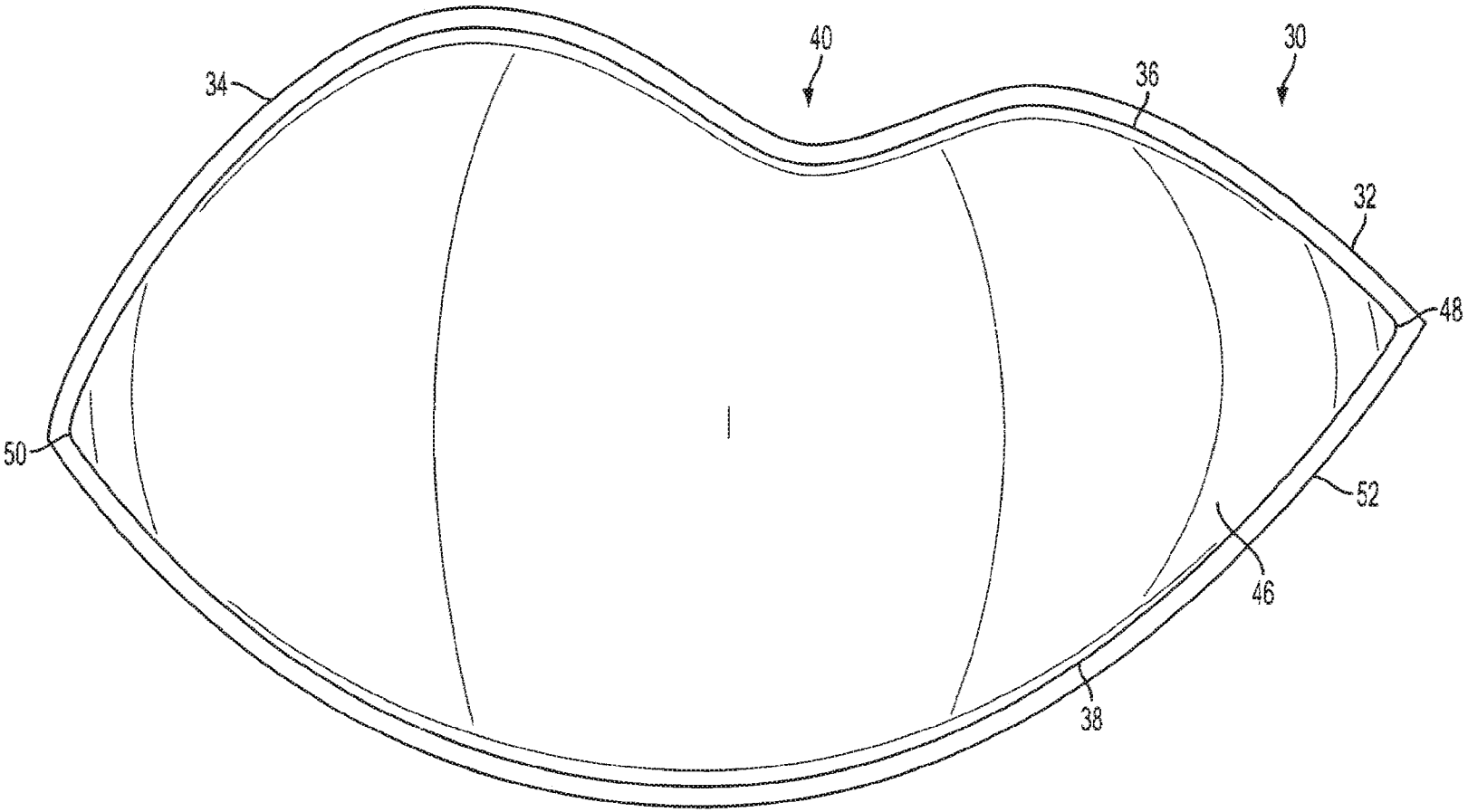
FIG. 3 is an illustration of a main surface of a push up insert according to the present disclosure.
Figure 5:
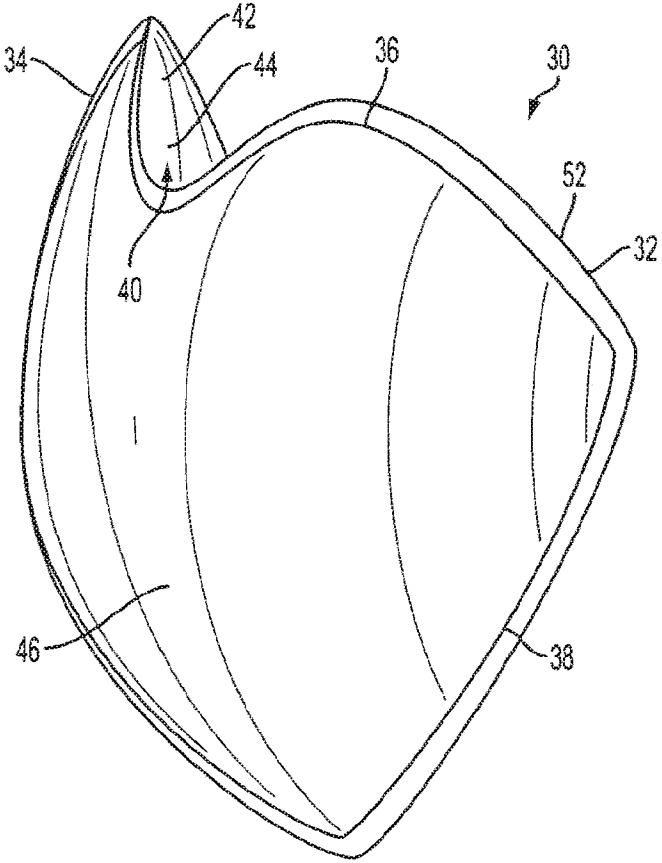
FIG. 5 is an isometric view of a push up insert according to the present disclosure.
Figure 4:
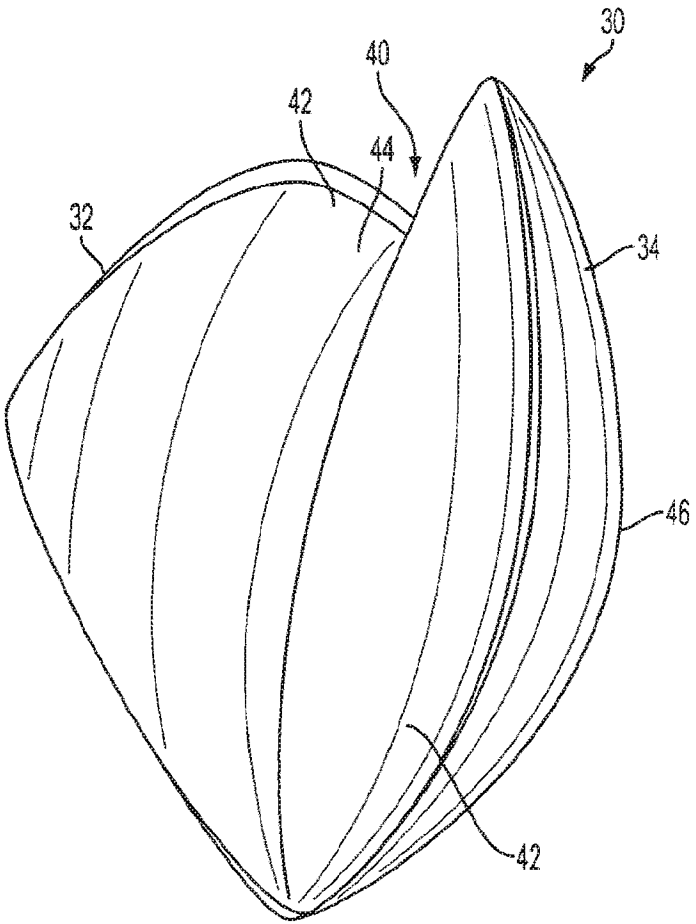
FIG. 4 is an illustration of an opposing main surface of a push up insert according to the present disclosure.
Figure 6:
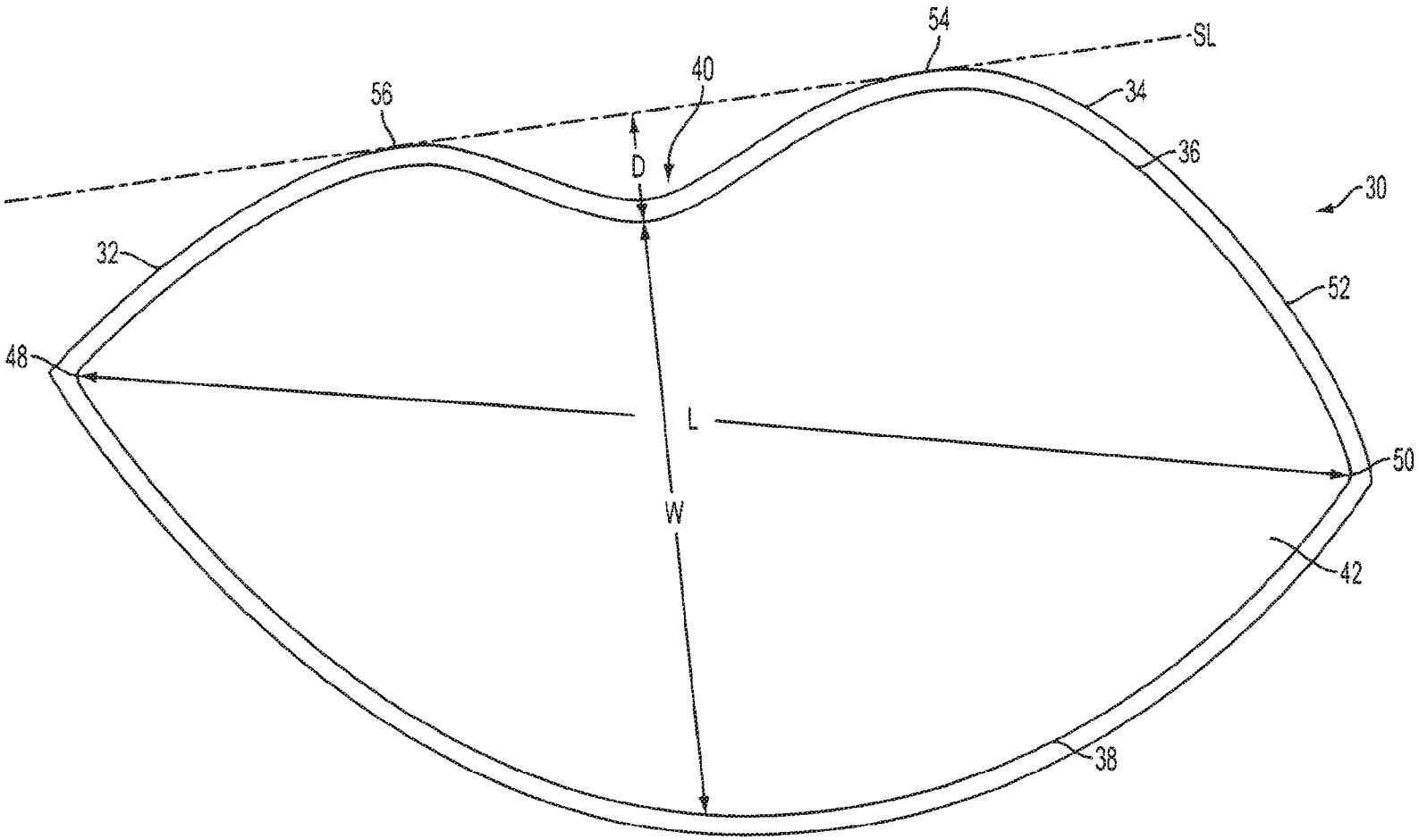
FIG. 6 is an isometric view of a push up insert according to the present disclosure.

According to an embodiment of the present disclosure, a kidney-shaped push up insert 30 is provided comprising a first lobe 32, and a second lobe 34 on an opposing side of the insert 30 from the first lobe 32, as shown in FIG. 3. The insert 30 has a top side 36, and a bottom side 38 on an opposing side of the insert 30 from the top side 36. A notch 40 is formed in the top side 36 between the first lobe 32 and second lobe 34. The insert 30 has a first main surface 42 having a depression 44 formed adjacent the top side 36 and the depression 44 extends towards the notch 40, as shown in FIGS. 4 and 5. A second main surface 46 opposes the first main surface 42. The second main surface 46 is a substantially smooth arcuate-shaped surface. The first lobe 32 is narrower in width between the top side 36 and the bottom side 38 than the second lobe 34, and the second lobe 34 is thicker between the first main surface 42 and the second main surface 46 than the first lobe 32. A ratio of a maximum thickness between the first main surface 42 and the second main surface 46 to a maximum length L between opposing ends 48, 50 of the first lobe 32 and second lobe 34 is less than about 9 (see FIG. 6).

In certain embodiments, the ratio of the maximum thickness between the first main surface 42 and the second main surface 46 to the maximum length L between opposing ends 48, 50 of the first lobe 32 and second lobe 36 ranges from about 2 to about 8. In certain other embodiments, the ratio of the maximum thickness between the first main surface 42 and the second main surface 46 to the maximum length L between opposing ends 48, 50 of the first lobe 32 and second lobe 36 is about 4.5.

According to another embodiment of the present disclosure, a kidney-shaped push up insert 30 is provided comprising a first lobe 32, and a second lobe 34 on an opposing side of the insert 30 from the first lobe 32, as shown in FIG. 3. The insert 30 has a top side 36 and a bottom side 38 on an opposing side of the insert 30 from the top side 36. A notch 40 is formed in the top side 36 between the first lobe 32 and second lobe 34. The insert 30 has a first main surface 42 having a depression 44 formed adjacent the top side 36 and the depression 44 extends towards the notch 40, as shown in FIGS. 4 and 5. A second main surface 46 opposes the first main surface 42. The second main surface 46 is a substantially smooth arcuate-shaped surface. The first lobe 32 is narrower in width between the top side 36 and the bottom side 38 than the second lobe 34, and the second lobe 34 is thicker between the first main surface 42 and the second main surface 46 than the first lobe 32. A ratio of a depth D of the notch 40 from a straight line SL connecting the first lobe 32 and second lobe 34 along the top side 36 of the insert to a width W of the insert from the top side 36 to the bottom side 38 at the notch 40 is less than about 4 (see FIG. 6). The straight line SL connects the high point 56 of the first lobe 32 with the high point 54 of the second lobe.

In certain embodiments, the ratio of the depth of the notch 40 from the straight line SL connecting the first lobe 32 and second lobe 34 along the top side 36 of the insert 30 to the width W of the insert 30 from the top side 36 to the bottom side 38 at the notch 40 ranges from about 1 to less than about 4. In certain embodiments, the ratio of the depth D of the notch 40 from the straight line SL connecting the first lobe 32 and second lobe 34 along the top side 36 of the insert 30 to the width W of the insert from the top side 36 to the bottom side 38 at the notch 40 is about 2.

In certain embodiments, the top side 36 and bottom side 38 meet at opposing ends 48, 50 of the first lobe 32 and second lobe 34. The push up insert 30 according to embodiments of the present disclosure insert is pliable and sufficiently maintains its shape to push up a breast of a wearer when inserted into a bra cup 62.

Figure 7:
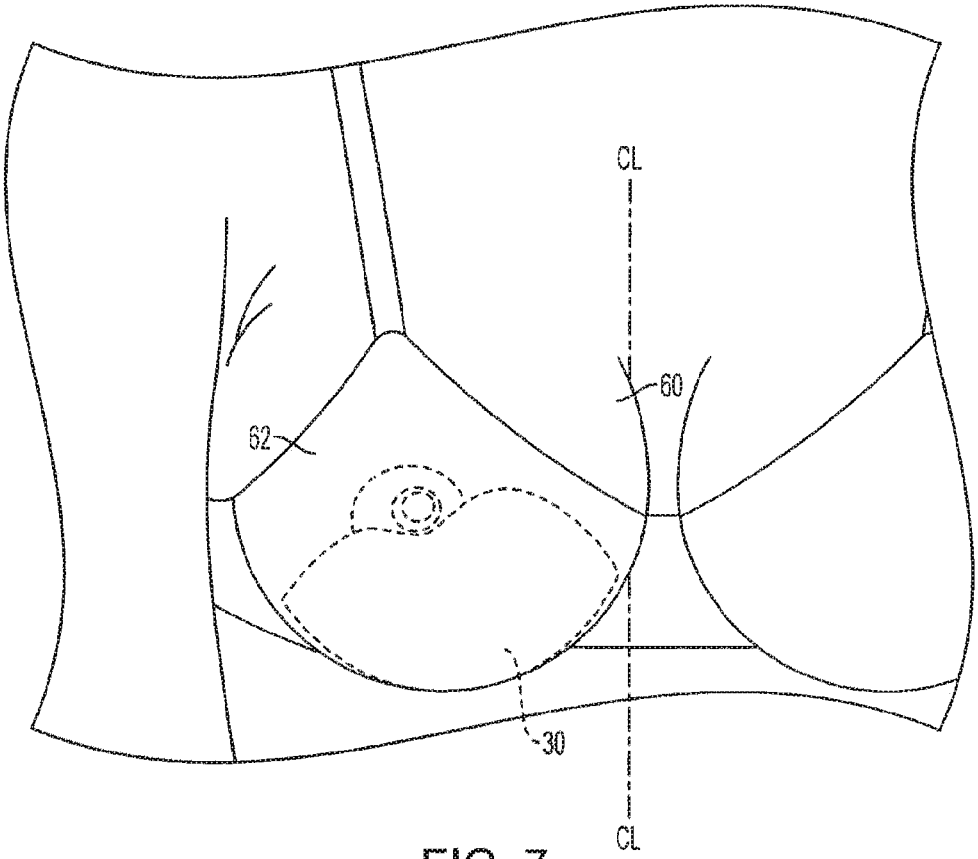
FIG. 7 illustrates the use of a push up insert according to the present disclosure.
Figure 8:
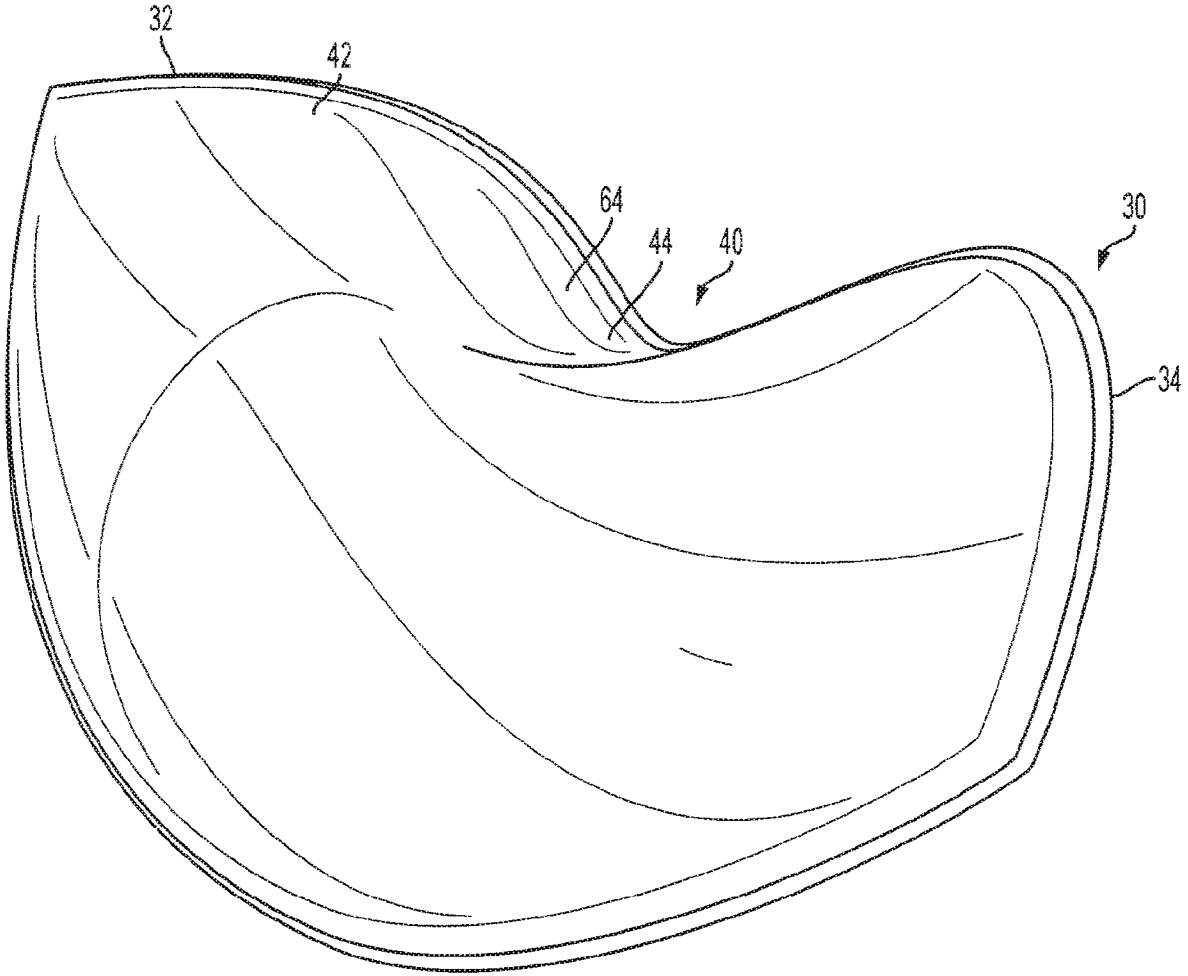
FIG. 8 illustrates the first main surface of a push up insert according to the present disclosure.

When inserted in a bra cup 62, the push up insert 30 according to the present disclosure is inserted so that the first main surface 42 faces the wearer's chest and the opposing second main surface 46 faces away from the wearer towards the bra cup 62. The push up insert 30 is inserted under a breast such that the top side 36 faces upward and the bottom side 38 faces downward. The second lobe 34 is positioned toward the vertical centerline CL of the wearer's chest when the chest is viewed from the front and the first lobe 32 is positioned further away from the vertical centerline CL than the [first] *second* lobe [32] *34*. In this manner, the push up insert 30 is engineered so that the larger second lobe 34 pushes the breast 60 up to enhance cleavage, as shown in FIG. 7. The push up insert 30 is contoured to conform to the body of the wearer and the depression 44 is configured to lift and support the breast 60 of the wearer. The depression 44 is centered about the notch 40 and starts descending towards the notch 40 above the midpoint of the width towards the top side 36. The depression [40] *44* creates a sloped shelf 64, as shown in FIG. 8, which lifts and supports the breast 60, as shown in FIG. 8. FIG. 8 is an isometric view of the first main surface 42 illustrating the first lobe 32, the second lobe 34, the depression 44, the notch 40, and the sloped shelf 64.

In certain embodiments of the present disclosure, the kidney-shaped push up insert can have a maximum length L between opposing ends 48, 50 of about 5⅝ incites, a maximum thickness between the first main surface and second main surface of about 1¼ inches, a width W from the top side 36 to the bottom side 38 at the notch 40 of about 2⅝ inches, and a depth D of the notch 40 from a straight line SL connecting the first lobe 32 and second lobe 34 along the top side 36 of the insert 30 of about 0.3 inches.

In certain embodiments of the present disclosure, the ratio of a maximum thickness between the first main surface 42 and the second main surface 46 to a maximum length L between opposing ends 48, 50 of the first lobe 32 and second lobe 34 is set so that the push up insert 30 formed from a certain material will be both sufficiently pliable to conform to the breast and be sufficiently rigid to lift the breast to comfortably provide enhanced cleavage. In certain embodiments, the ratio is set to be less than about 9.

In certain embodiments of the present disclosure, the ratio of a depth D of the notch 40 from a straight line SL connecting the first lobe 32 and second lobe 34 along the top side 36 of the insert to a width W of the insert from the top side 36 to the bottom side 38 at the notch 40 is set so that the push up insert 30 formed from a certain material will be sufficiently pliable and sufficiently lift the breast to comfortably provide enhanced cleavage. In certain embodiments, the ratio is set to be less than about 4.

When inserted in a bra cup 62, the engineered push up insert 30 according to the present disclosure increases volume to provide a full cup size increase in apparent breast size. The engineered push up insert 30 is comfortable, invisible under clothing, and is easily inserted into any bra. Push up inserts 30 according to the present disclosure are stain-resistant and washable.

According to certain embodiments of the present disclosure, the engineered kidney-shaped push up insert 30 comprises a soft, non-porous polymer, that is comfortable to wear, yet it has sufficient rigidity to lift and support the breast 60 of a wearer. In certain embodiments, the non-porous polymer is a silicone. The push up insert 30 can be formed from a single molded, soft polymer, such as a silicone rubber. In other embodiments, the push up insert 30 can comprise an outer surface completely enclosing a gel interior. The gel can be a silicone gel and the outer surface a non-porous polymer film, such as a polymer film selected from the group consisting of silicones polyolefins, polyesters, polyvinyl acetates, polyvinylidene chlorides, and fluoropolymers. The non-porous polymer film outer surface can comprise opposing non-porous polymer films sealed around the periphery 52 of the top and bottom sides 36, 38. Alternatively, the periphery 52 represents flashing, which can be optionally removed, in the case of a single piece molded insert 30.

The two lobe, kidney-shaped, engineered push up insert 30 of the present disclosure provides increased volume and cleavage over prior art pads. Engineered push up inserts according to the present disclosure provide greater comfort, as they are anatomically designed to conform to the breast, and provide greater support than substantially semi-circular-shaped and fabric over foam bra-filling pads.

Engineered push up inserts according to the present disclosure are molded so that a greater amount of silicone is channeled along the bottom and sides of the push up insert 30 to create lift and maximize cleavage. The push up insert 30 according to the present disclosure can be opaque, translucent, or transparent.

Figure 9:
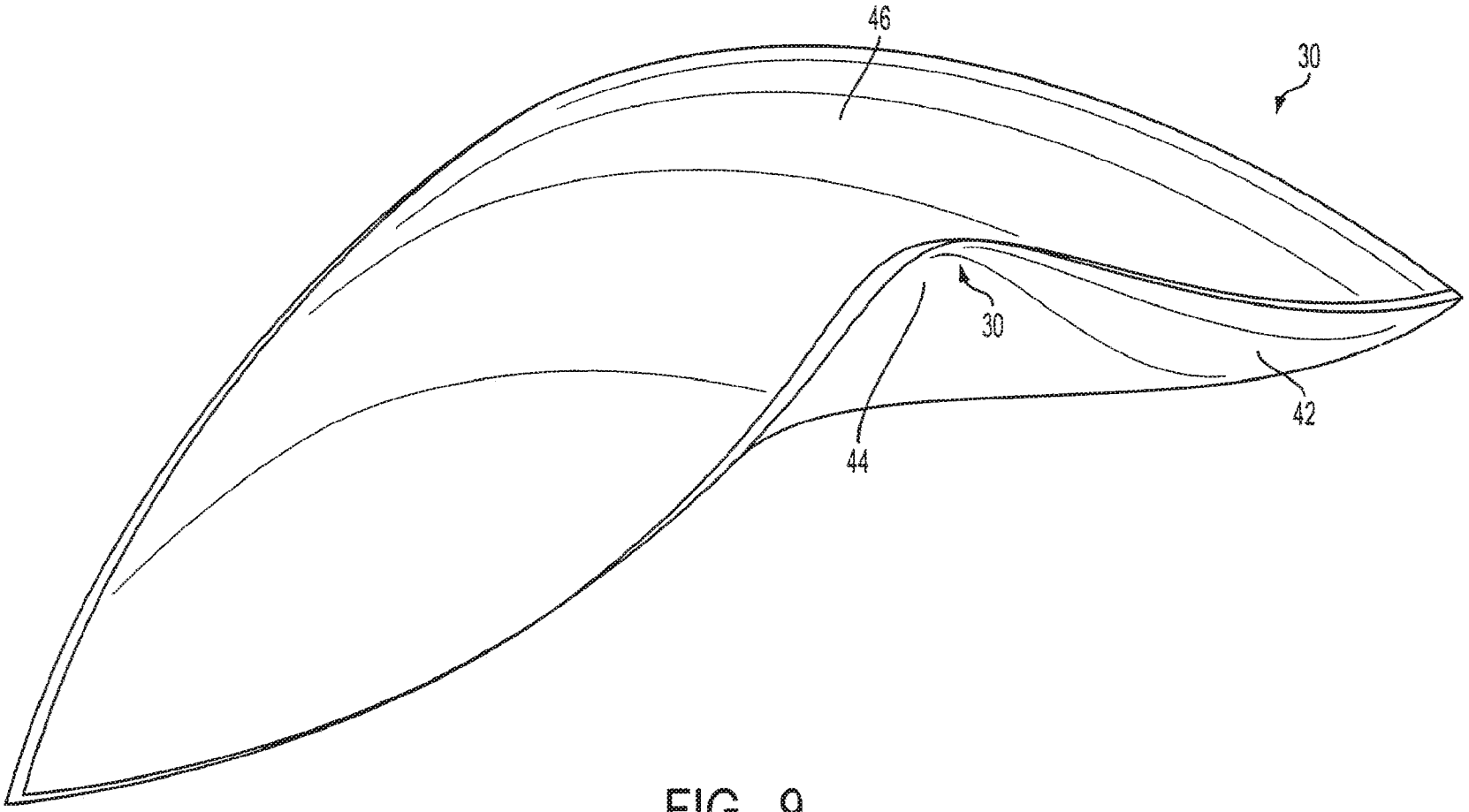
FIG. 9 illustrates the second main surface of a push up insert according to the present disclosure.
Figure 10:
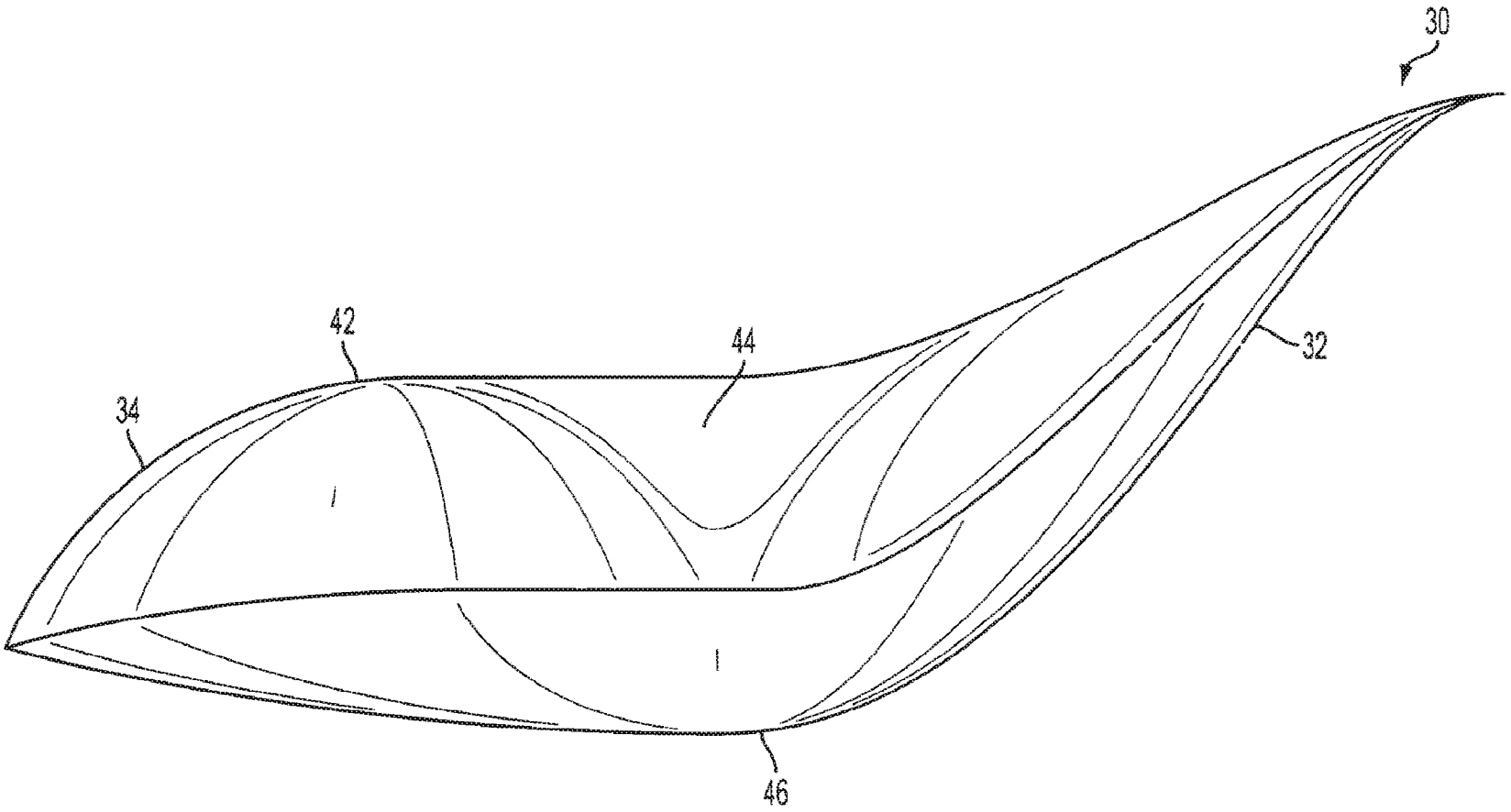
FIG. 10 is an edge view of the depression of a push up insert according to the present disclosure.

Additional views of engineered push up inserts according to the present disclosure illustrating different features of the push up inserts are shown in FIGS. 9 and 10. FIG. 9 illustrates the second main surface 46 and its substantially smooth arcuate-shaped surface, and the depression 44 formed on the first main surface 42. FIG. 10, looking edge on at the depression 44, illustrates the difference between the relatively thinner first lobe 32, and relatively thicker second lobe 34.

Figure 11:
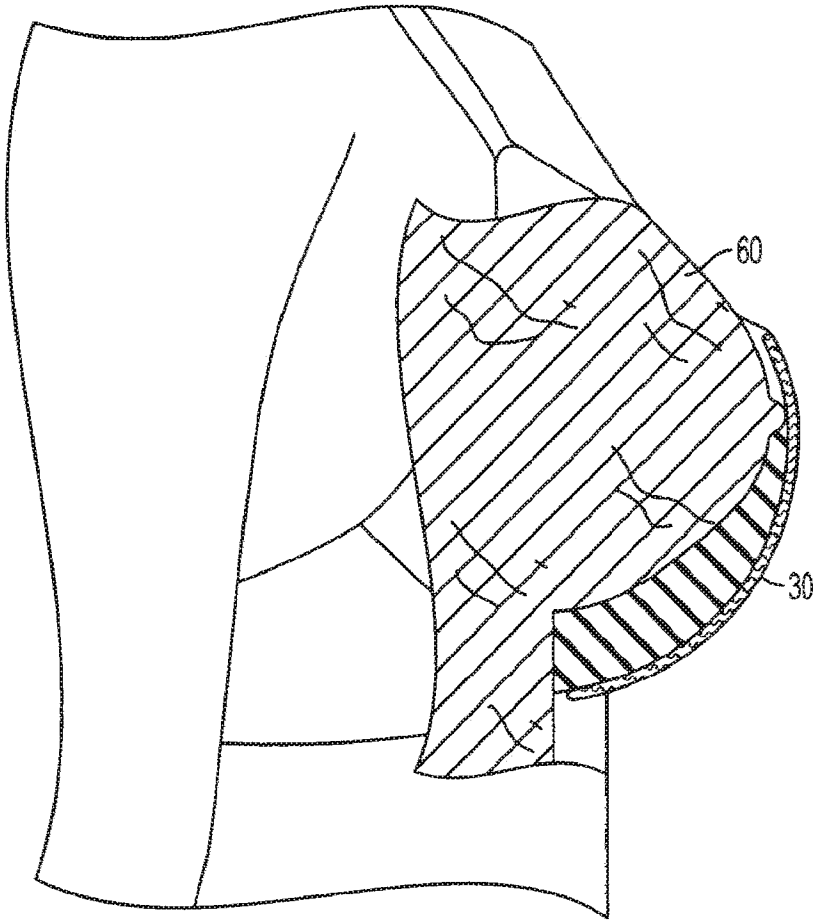
FIG. 11 illustrates the push up insert according to the present disclosure lifting up a breast.

FIG. 11 shows the push up insert 30 pushing up the breast 60 and the pliable push up insert 30 conforming to the breast 60 to increase volume and cleavage, while providing a natural appearance.

Figure 12:
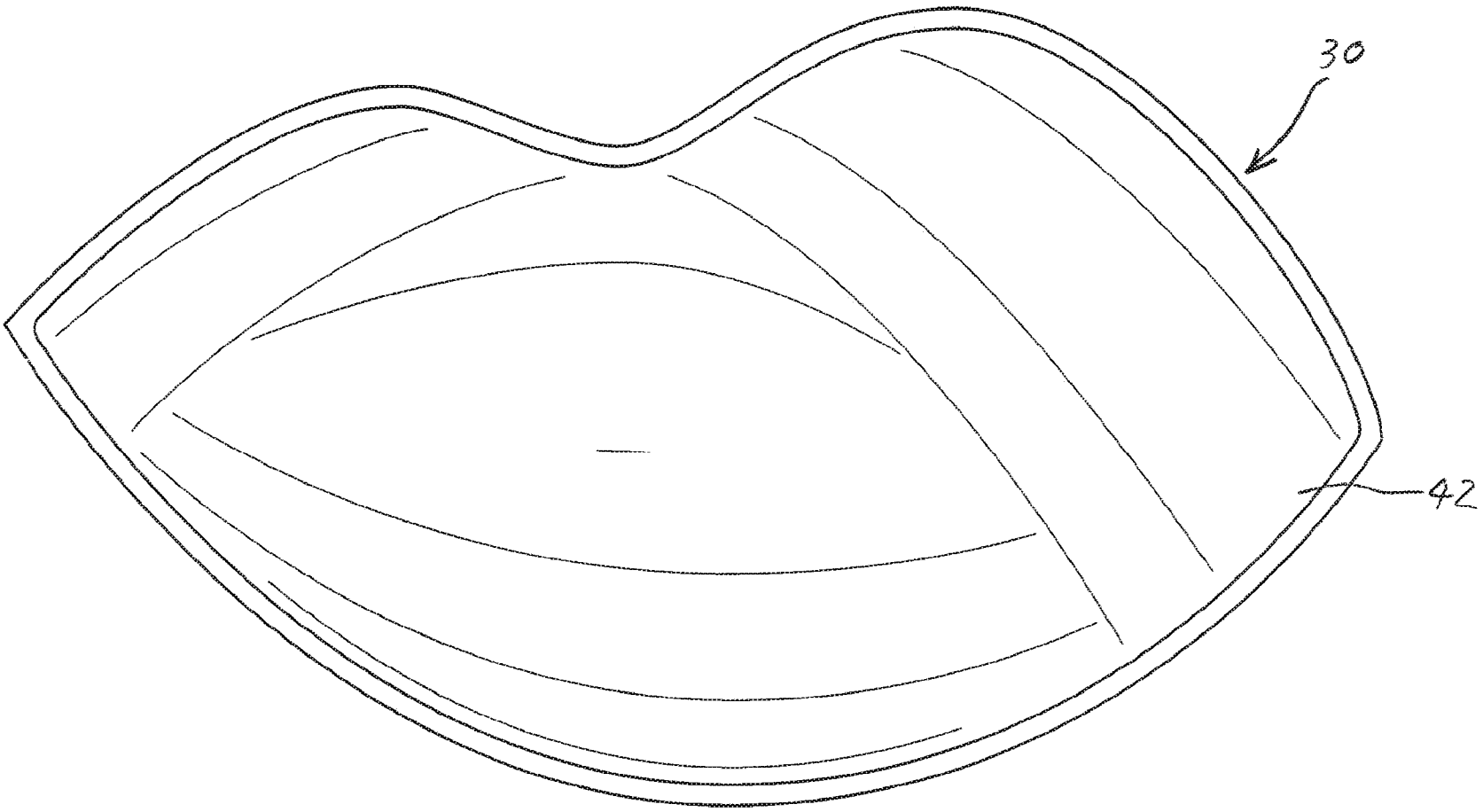
FIG. 12 illustrates the first main surface of a push up insert according to the present disclosure.
Figure 13:
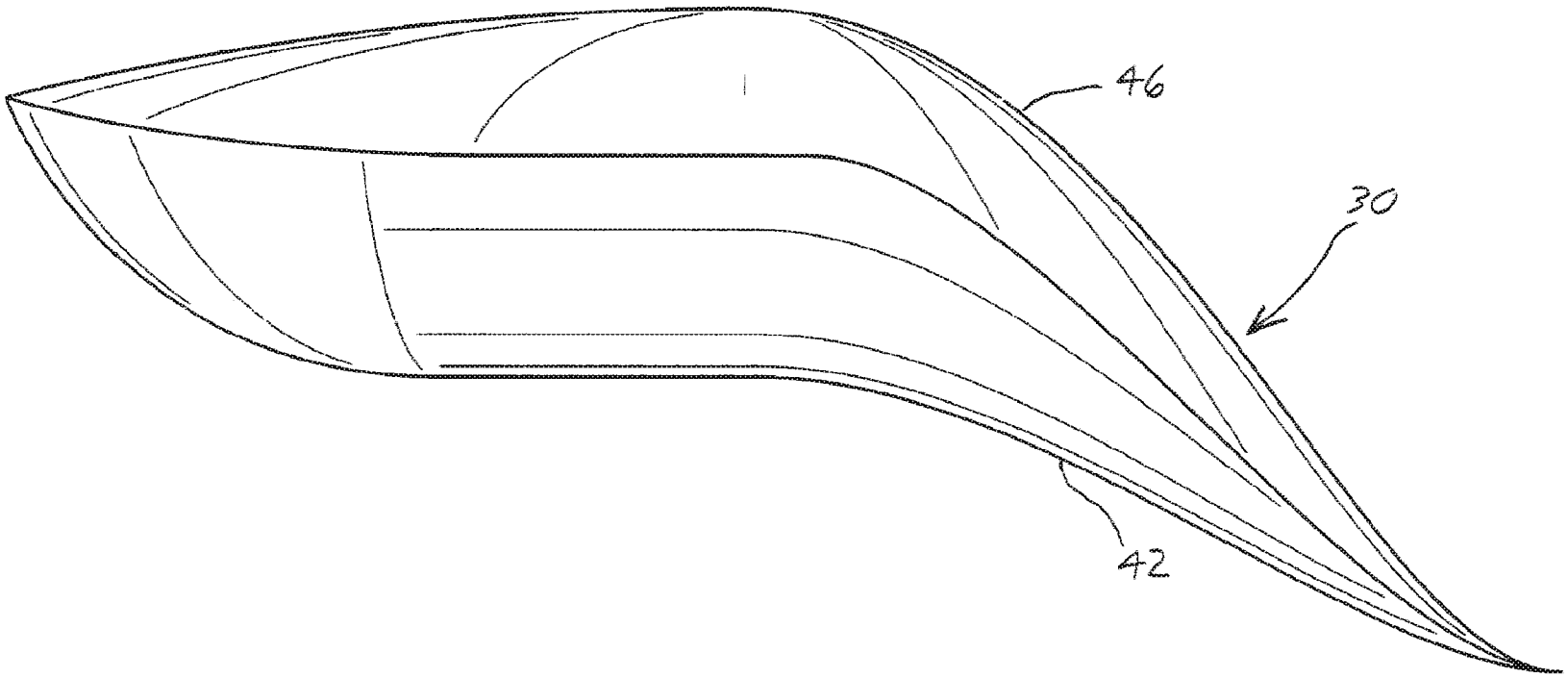
FIG. 13 is a side view of a push up insert according to the present disclosure.
Figure 14:
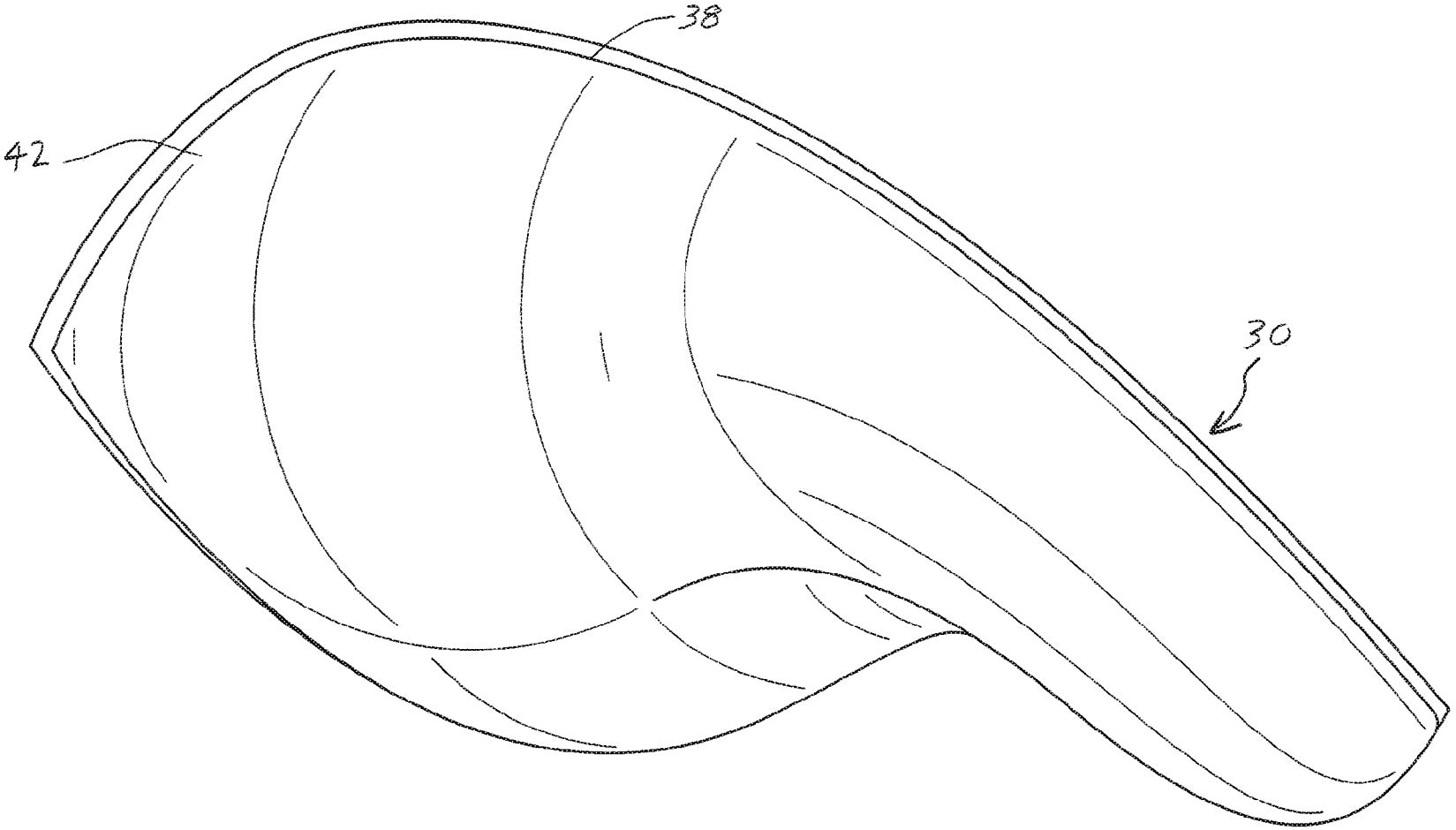
FIG. 14 is a bottom view of a push up insert according to the present disclosure.
Figure 15:
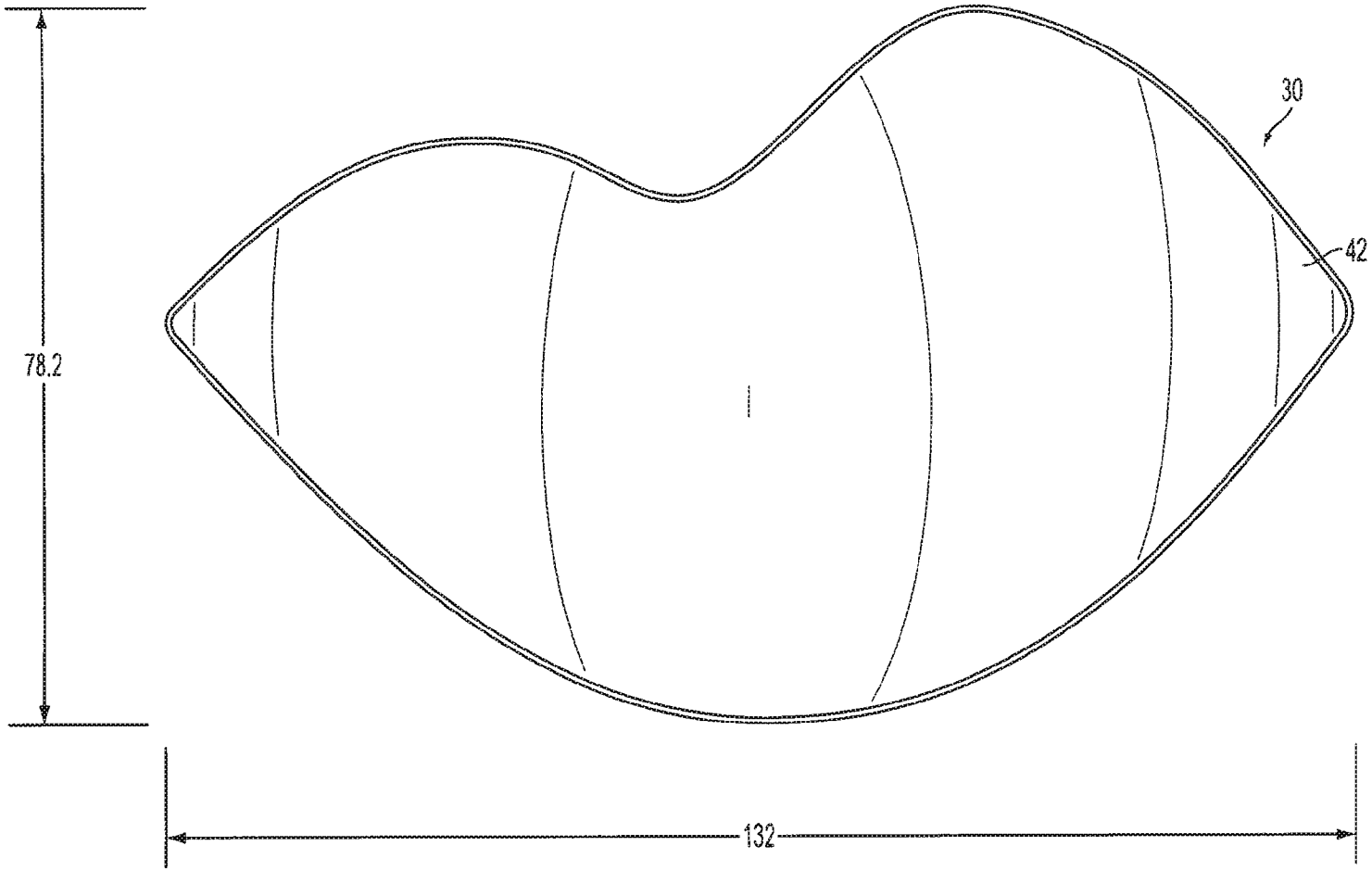
FIG. 15 is a view of the first main surface of a push up insert according to the present disclosure.
Figure 16:
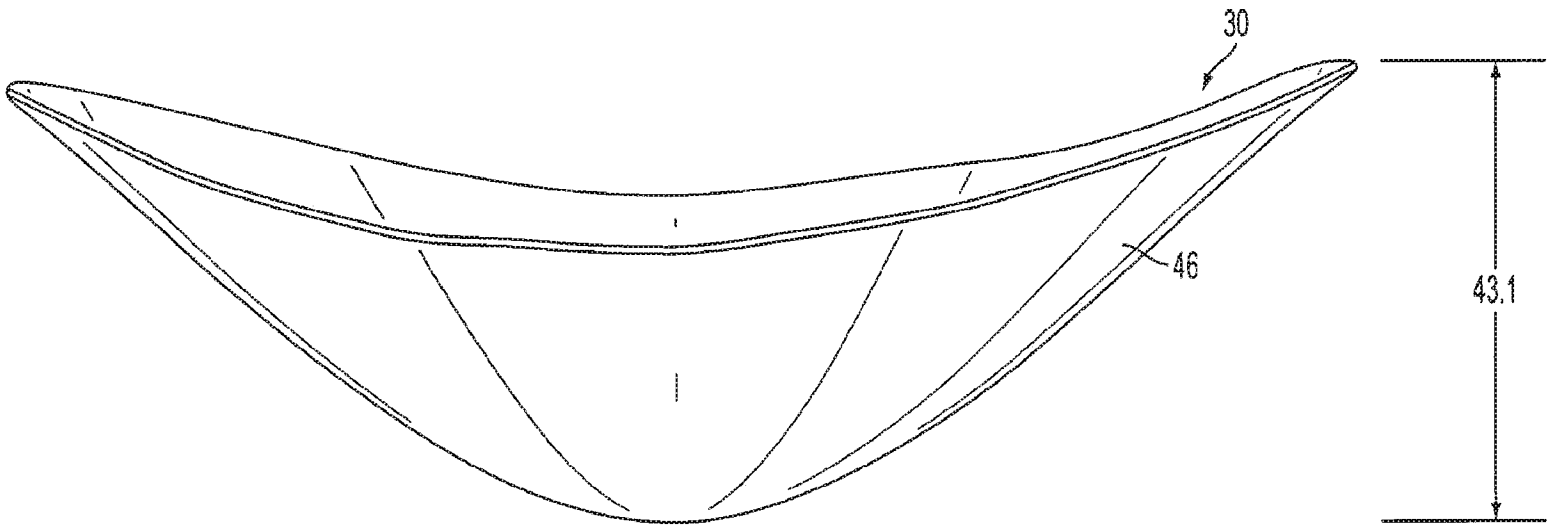
FIG. 16 is a side view of the second main surface of a push up insert according to the present disclosure.
Figure 17:
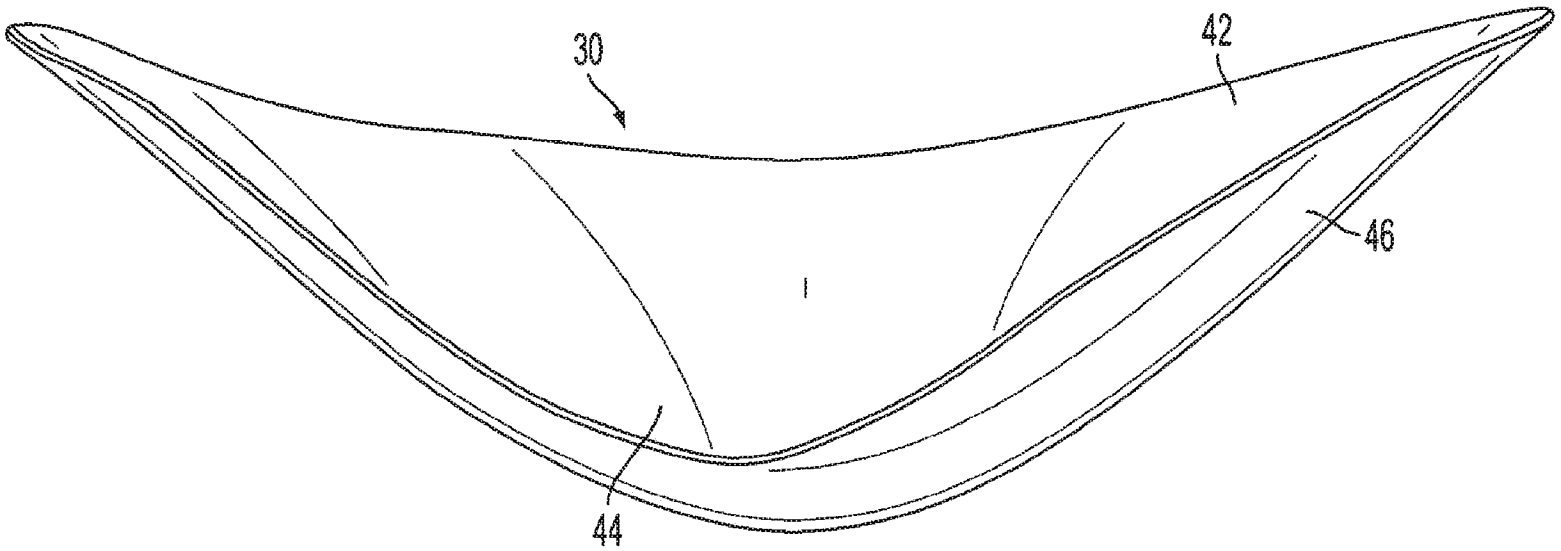
FIG. 17 is a side view of the first main surface of a push up insert according to the present disclosure.
Figure 18:
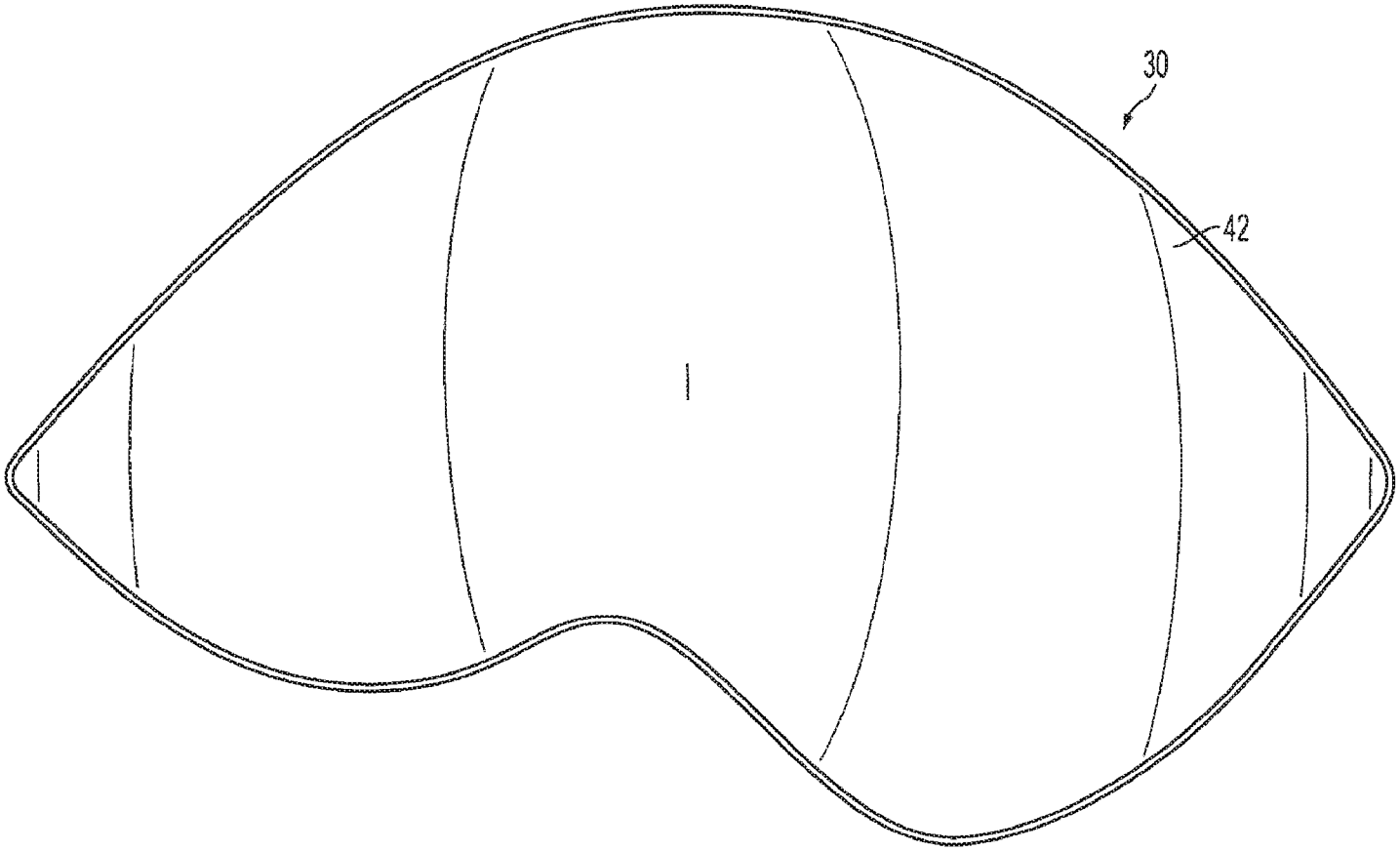
FIG. 18 is a view of the first main surface of a push up insert according to the present disclosure.
Figure 19:
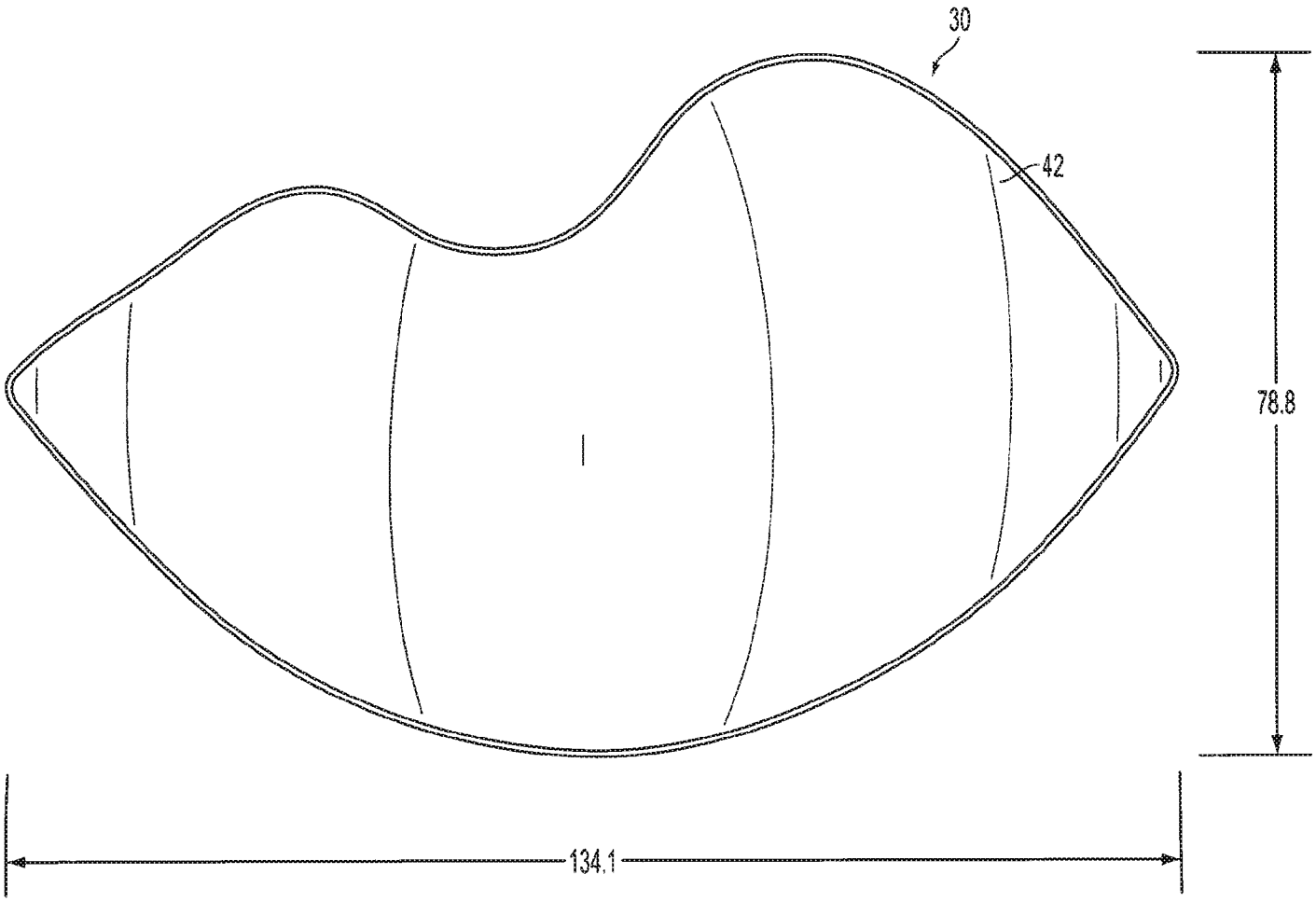
FIG. 19 is a view of the first main surface of a push up insert according to the present disclosure.
Figure 20:
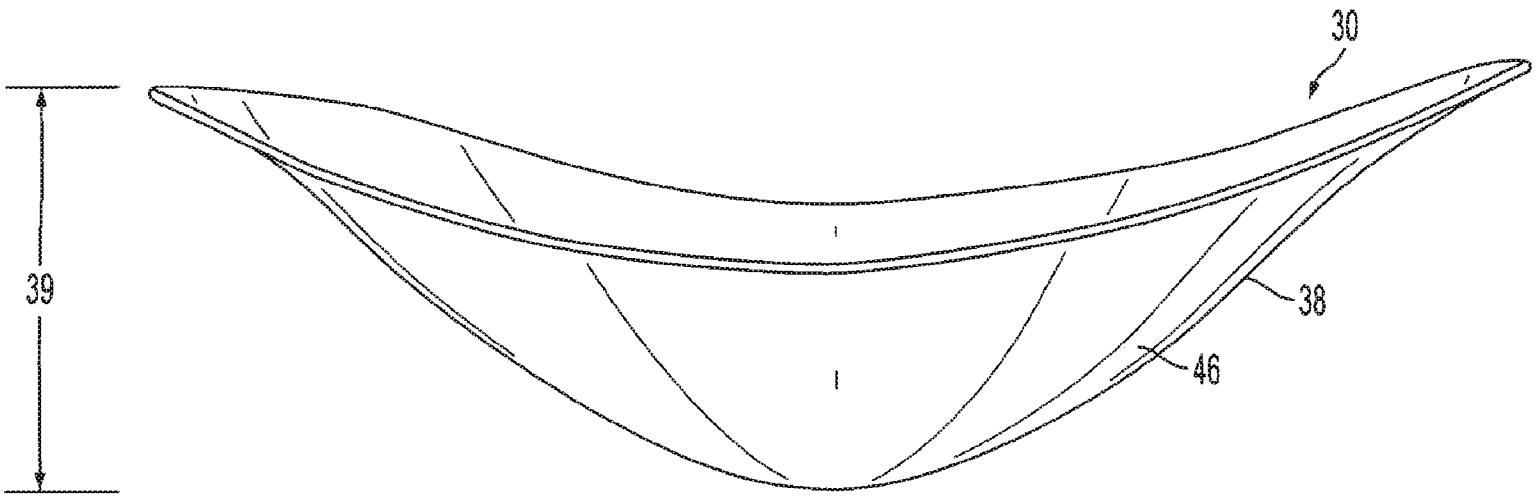
FIG. 20 is a side view of the second main surface of a push up insert according to the present disclosure.
Figure 21:
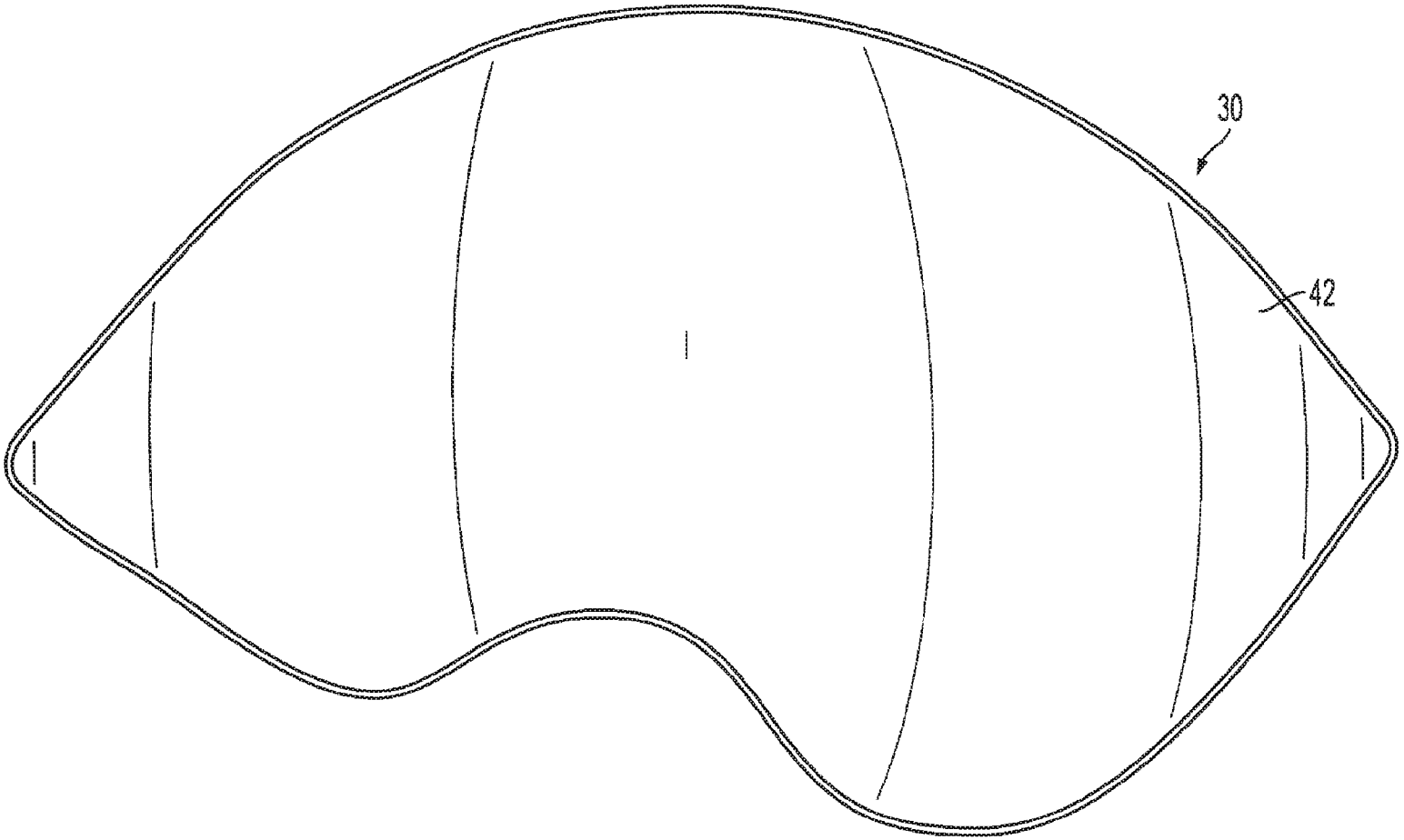
FIG. 21 is a view of the first main surface of a push up insert according to the present disclosure.
Figure 22:
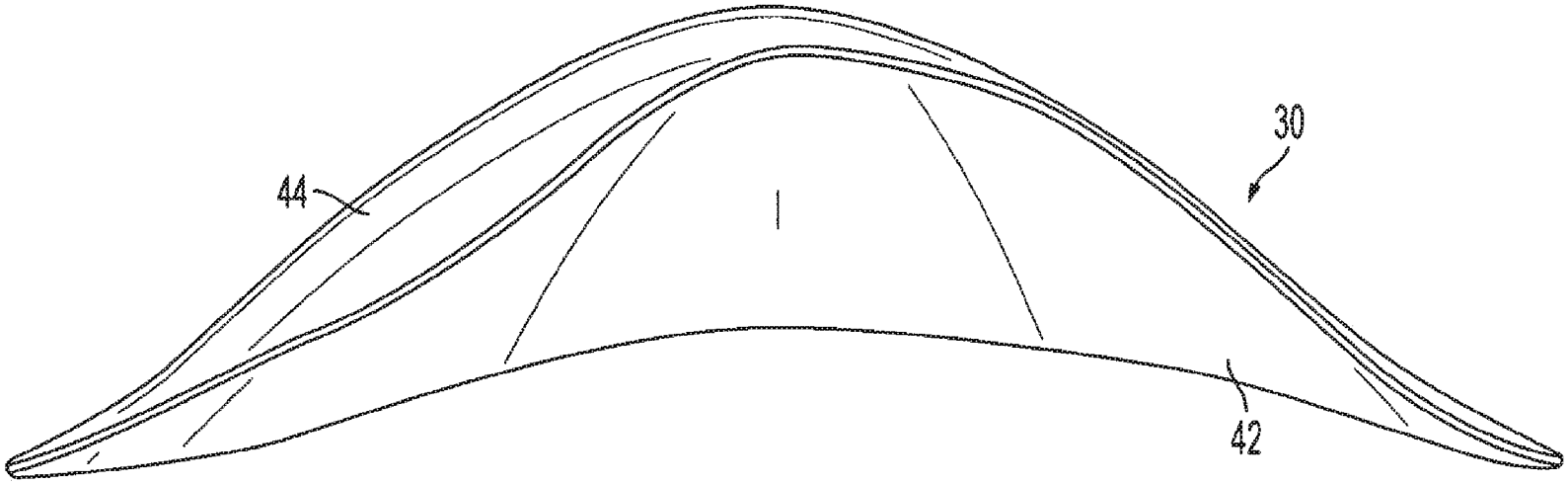
FIG. 22 is a side view of the first main surface of a push up insert according to the present disclosure.

FIGS. 12-21 illustrate additional embodiments of push up inserts according to the present disclosure. FIG. 12 is a view of the first main surface 42 according to an embodiment of the present disclosure. FIG. 13 is a side view of a push up insert according to the present disclosure. FIG. 14 is a bottom view of a push up insert according to the present disclosure. FIG. 15 illustrates the first main surface 42 of an embodiment of a push up insert according to the present disclosure, showing the overall dimension in millimeters. FIG. 16 illustrates a side view of the second main surface 46 of an embodiment of a push up insert according to the present disclosure, showing the height dimension in millimeters. FIG. 17 is a side view of the first main surface of an embodiment of a push up insert according to the present disclosure. FIG. 18 is a view of the first main surface of an embodiment of a push up insert according to the present disclosure. FIG. 19 is a view of the first main surface of an embodiment of a push up insert according to the present disclosure showing the overall dimensions in millimeters. FIG. 20 illustrates a side view of the second main surface 46 of an embodiment of a push up insert according to the present disclosure, showing the height dimension in millimeters. FIG. 21 is a view of the first main surface of an embodiment of a push up insert according to the present disclosure. FIG. 22 is a side view of the first main surface of an embodiment of a push up insert according to the present disclosure.

The embodiments illustrated in the instant disclosure are for illustrative purposes only. They should not be construed to limit the claims. As is clear to one of ordinary skill in the art, the instant disclosure encompasses a wide variety of embodiments not specifically illustrated herein. While the compositions and methods of this disclosure have been described in terms of exemplary embodiments, it will be apparent to those of skill in the art that variations may be applied to the compositions and methods and in the steps or in the sequence of steps of the method described herein without departing from the concept, spirit and scope of the invention.

What is claimed is:

[1. A kidney-shaped push up insert comprising:

a first lobe;

a second lobe on an opposing side of the bra insert from said first lobe;

a top side;

a bottom side on an opposing side of the bra insert from said top side, wherein a notch is funned in the top side between the first lobe and second lobe;

a first main surface having a depression formed adjacent the top side and extending towards the notch; and a second main surface opposing said first main surface, wherein the second main surface is a substantially smooth arcuate-shaped surface, wherein the first lobe is narrower in width between the top side and the bottom side than the second lobe, and the second lobe is thicker between the first main surface and the second main surface than the first lobe, wherein a ratio of a maximum thickness between the first main surface and the second main, surface to a maximum length between opposing ends of the first lobe and second lobe is less than about 9, and wherein the bra insert is kidney-shaped as viewed from a direction perpendicular to the first main surface or second main surface.]

[2. The kidney-shaped push up bra insert according to claim 1, wherein the ratio of the maximum thickness between the first main surface and the second main surface to the maximum length between opposing ends of the first lobe and second lobe ranges from about 2 to about 8.]

[3. The kidney-shaped push up bra insert according to claim 1, wherein the ratio of the maximum thickness between the first main surface and the second main surface to the maximum length between opposing ends of the first lobe and. second lobe is about 4.5.]

[4. The kidney-shaped push up bra insert according to claim 1, wherein the top and bottom sides meet at opposing ends of the first lobe and second lobe.]

[5. The kidney-shaped push up bra insert according to claim 1, wherein the insert comprises a non-porous polymer.]

[6. The kidney-shaped push up bra insert according to claim 1, wherein the non-porous polymer is a silicone.]

[7. The kidney-shaped push up bra insert according to claim 1, wherein the bra insert is pliable and pushes up a breast of a wearer when inserted into a bra.]

[8. The kidney-shaped push up bra insert according to claim 7, wherein the bra insert conforms to the breast of the wearer.]

[9. The kidney-shaped push up bra insert according to claim 8, wherein the depression lifts and supports the breast of the wearer.]

[10. The kidney-shaped push up bra insert according to claim 8, wherein the first lobe and the second lobe push up the breast.]

[11. A kidney-shaped push up bra insert comprising:

a first lobe;

a second lobe on an opposing side of the bra insert from said first lobe;

a top side;

a bottom side on an opposing side of the bra insert from said top side, wherein a notch is formed in the top side between the first lobe and second lobe; and a first main surface having a depression formed adjacent the top side and extending towards the notch;

a second main surface opposing said first main surface, wherein the second main surface is a substantially smooth arcuate-shaped surface, wherein the first lobe is narrower in width between the top side and the bottom side than the second lobe, and the second lobe is thicker between the first main surface and the second main surface than the first lobe, wherein a ratio of a depth of the notch from a straight line connecting the first lobe and second lobe along the top side of the bra insert to a width of the bra insert from the top side to the bottom side at the notch is less than about 4, and wherein the bra insert is kidney-shaped as viewed from a direction perpendicular to the first main surface or second main surface.]

[12. The kidney-shaped push up insert according to claim 11, wherein the ratio of the depth of the notch from the straight line connecting the first lobe and second lobe along the top side of the bra insert to the width of the bra insert from the top side to the bottom side at the notch ranges from about 1 to less than about 4.]

[13. The kidney-shaped push up insert according to claim 11, wherein the ratio of the depth of the notch from the straight line connecting the first lobe and second lobe along the top side of the bra insert to the width of the bra insert from the top side to the bottom side at the notch is about 2.]

[14. The kidney-shaped push up bra insert according to claim 11, wherein the top and bottom sides meet at opposing ends of the first lobe and second lobe.]

[15. The kidney-shaped push up bra insert according to claim 11, wherein the bra insert comprises a non-porous polymer.]

[16. The kidney-shaped push up bra insert according to claim 11, wherein the non-porous polymer is a silicone.]

[17. The kidney-shaped push up bra insert according to claim 11, wherein the bra insert is pliable and pushes up a breast of a wearer when inserted into a bra.]

[18. The kidney-shaped push up bra insert according to claim 17, wherein the bra insert conforms to the breast of the wearer.]

[19. The kidney-shaped push up bra insert according to claim 18, wherein the depression lifts and supports the breast of the wearer.]

[20. The kidney-shaped push up bra insert according to claim 18, wherein the first lobe and second lobe push up the breast.]

*21. A kidney-shaped push up bra insert, comprising:*

*a top side;*

*a bottom side on an opposing side of the bra insert from said top side,*

*the top side and the bottom side meet at a first end and a second end;*

*a first lobe having a first vertex spaced from the first end;*

*a second lobe on an opposing side of the bra insert from said first lobe having a second vertex spaced from the second end, the second lobe being configured to be positioned closer to a vertical centerline of a wearer's chest than the first lobe;*

*the top and bottom sides meet at opposing ends of the first and second lobes;*

*a notch formed in the top side between the first vertex and the second vertex;*

*a first main surface having a depression formed adjacent the top side and extending towards the notch; and*

*a second main surface opposing said first main surface, wherein the second main surface is a substantially smooth arcuate-shaped surface,*

*wherein the bra insert is kidney-shaped as viewed from a direction perpendicular to the first main surface or second main surface.*

*22. The kidney-shaped push up bra insert according to claim 21, wherein the bra insert comprises a non-porous polymer.*

*23. The kidney-shaped push up bra insert according to claim 22, wherein the non-porous polymer is a silicone.*

*24. The kidney-shaped push up bra insert according to claim 21, wherein the bra insert is pliable and configured to push up a breast of the wearer when inserted into a bra.*

*25. The kidney-shaped push up bra insert according to claim 24, wherein the bra insert conforms to the breast of the wearer.*

*26. The kidney-shaped push up bra insert according to claim 25, wherein the depression is configured to lift and support the breast of the wearer.*

*27. The kidney-shaped push up bra insert according to claim 21, wherein the bottom side includes a substantially convex arcuate bottom edge.*

*28. The kidney-shaped push up bra insert according to claim 21, wherein the bottom edge of the bottom side extends substantially across the entire width of the bra insert.*

* * * * *